(12) United States Patent
Ding et al.

(10) Patent No.: US 11,342,564 B2
(45) Date of Patent: May 24, 2022

(54) THREE-DIMENSIONAL ARCHITECTURED ANODE, A DIRECT CARBON FUEL CELL INCLUDING THE THREE-DIMENSIONAL ARCHITECTURED ANODE, AND RELATED METHODS

(71) Applicant: Battelle Energy Alliance, LLC, Idaho Falls, ID (US)

(72) Inventors: Dong Ding, Idaho Falls, ID (US); Ting He, Idaho Falls, ID (US); Wei Wu, Idaho Falls, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 185 days.

(21) Appl. No.: 16/629,253

(22) PCT Filed: Jul. 18, 2018

(86) PCT No.: PCT/US2018/042628
§ 371 (c)(1),
(2) Date: Jan. 7, 2020

(87) PCT Pub. No.: WO2019/018489
PCT Pub. Date: Jan. 24, 2019

(65) Prior Publication Data
US 2020/0136151 A1    Apr. 30, 2020

Related U.S. Application Data

(60) Provisional application No. 62/534,452, filed on Jul. 19, 2017.

(51) Int. Cl.
*H01M 4/90* (2006.01)
*H01M 4/88* (2006.01)
(Continued)

(52) U.S. Cl.
CPC ....... *H01M 4/9025* (2013.01); *H01M 4/8885* (2013.01); *H01M 4/9066* (2013.01);
(Continued)

(58) Field of Classification Search
CPC ... H01M 2008/147; H01M 2300/0074; H01M 4/8817; H01M 4/8885; H01M 4/9016;
(Continued)

(56) References Cited

U.S. PATENT DOCUMENTS 3,689,320 A    9/1972  Ashcroft et al.
7,595,019 B2   9/2009  Cutler et al.
(Continued)

FOREIGN PATENT DOCUMENTS

CN    102364737 A    2/2012
CN    104916857 A    9/2015
(Continued)

OTHER PUBLICATIONS

Benamira et al., "Gadolinia-doped Ceria Mixed With Alkali Carbonates for SOFC Applications: II—An Electrochemical Insight," Int. J. Hydrogen Energy, vol. 37, (2012), pp. 19371-19379.
(Continued)

*Primary Examiner* — Victoria H Lynch
(74) *Attorney, Agent, or Firm* — TraskBritt

(57) ABSTRACT

A method of fabricating a three-dimensional (3D) architectured anode. The method comprises immersing a fabric textile in a precursor solution, the precursor solution comprising a nickel salt and gadolinium doped ceria (GDC). The nickel salt and GDC are absorbed to the fabric textile. The fabric textile comprising the absorbed nickel salt and GDC is removed from the precursor solution and calcined to form a 3D architectured anode comprising nickel oxide and GDC. Additional methods and a direct carbon fuel cell including the 3D architectured anode are also disclosed.

19 Claims, 6 Drawing Sheets

(51) Int. Cl.
*H01M 8/0232* (2016.01)
*H01M 8/1233* (2016.01)
*H01M 8/1246* (2016.01)
*H01M 8/14* (2006.01)

(52) U.S. Cl.
CPC ....... *H01M 8/0232* (2013.01); *H01M 8/1233* (2013.01); *H01M 8/1246* (2013.01); *H01M 8/141* (2013.01); *H01M 2008/147* (2013.01); *H01M 2300/0074* (2013.01)

(58) Field of Classification Search
CPC ............. H01M 4/9025; H01M 4/9033; H01M 4/9066; H01M 8/0232; H01M 8/1009; H01M 8/1233; H01M 8/1246; H01M 8/141; Y02E 60/50
See application file for complete search history.

(56) References Cited

U.S. PATENT DOCUMENTS

| | | | |
|---|---|---|---|
| 7,691,521 | B2 | 4/2010 | Ahmed et al. |
| 7,695,841 | B2 | 4/2010 | Crumm et al. |
| 7,709,124 | B2 | 5/2010 | Barnett et al. |
| 7,771,886 | B2 | 8/2010 | Horiuchi et al. |
| 8,679,700 | B2 | 3/2014 | Lee et al. |
| 8,715,886 | B1 | 5/2014 | Cable et al. |
| 8,802,316 | B1 | 8/2014 | Liu et al. |
| 9,281,525 | B2 | 3/2016 | De et al. |
| 2005/0019636 | A1 | 1/2005 | Kwon et al. |
| 2009/0068525 | A1* | 3/2009 | Iisaka .............. H01M 8/0245 429/480 |
| 2010/0167169 | A1 | 7/2010 | Day et al. |
| 2015/0099061 | A1* | 4/2015 | Liu .................. H01M 4/8857 427/78 |

FOREIGN PATENT DOCUMENTS

| | | | | |
|---|---|---|---|---|
| EP | 0195353 | A2 | 9/1986 | |
| GB | 2400723 | A * | 10/2004 | ........ H01M 8/1231 |
| IN | 2338/DEL/2015 | | 2/2017 | |
| WO | 2013/093853 | A1 | 6/2013 | |
| WO | 2019/018489 | A1 | 1/2019 | |

OTHER PUBLICATIONS

Cassir et al., "Strategies and New Developments in the Field of Molten Carbonates and High-temperature Fuel Cells in the Carbon Cycle," Int. J. Hydrogen Energy, vol. 37, (2012), pp. 19345-19350.
Elleuch et al., "Electrochemical Oxidation of Graphite in an Intermediate Temperature Direct Carbon Fuel Cell Based on Two-phases Electrolyte," Int. J. Hydrogen Energy, vol. 38, (2013), pp. 8514-8523.
Giddey et al., "A Comprehensive Review of Direct Carbon Fuel Cell Technology," Progress in Energy and Combustion Science, vol. 38, (2012), 360-399.
International Search Report for International Application No. PCT/US2018/042628, dated Sep. 13, 2018, 02 pages.
International Written Opinion for International Application No. PCT/US2018/042628, dated Sep. 13, 2018, 07 pages.
Jia et al., "A Direct Carbon Fuel Cell With (Molten Carbonate)/(Doped Ceria) Composite Electrolyte," Journal of Power Sources, vol. 195, (2010), pp. 5581-5586.
Jing et al., "An Improved Synthesis Method of Ceria-Carbonate Based Composite Electrolytes for Low-Temperature SOFC Fuel Cells," Int. J. Hydrogen Energy, vol. 38, (2013), pp. 16532-16538.
Wang et al., "State of the Art Ceria-carbonate Composites (3C) Electrolyte for Advanced Low Temperature Ceramic Fuel Cells (LTCFCs)," Int J. Hydrogen Energy, vol. 37, (2012), pp. 19417-19425.
Wu et al., "A High Performance Low Temperature Direct Carbon Fuel Cell, 15th International Symposium on Solid Oxide Fuel Cells (SOFC-XV)," Idaho National Laboratory, (2017), pp. 01-09.
Wu et al., "A High-Performance Direct Carbon Fuel Cell with a 3D Architectured Anode Operated Below 600° C.", Advanced Materials, vol. 30, (2017), pp. 01-06.
Xu et al., "Samaria-Doped Ceria Electrolyte Supported Direct Carbon Fuel Cell With Molten Antimony as the Anode," Ind. Eng. Chem. Res., vol. 52, (2013), pp. 17927-17933.
Yu et al., Electrochemical Oxidation of Catalytic Grown Carbon Fiber in a Direct Carbon Fuel Cell Using Ce0.8Sm0.2O1.9-Carbonate Electrolyte, Int. J. Hydrogen Energy, vol. 38, (2013), pp. 16615-16622.
Zhao et al., Nanocomposite Electrode Materials for Low Temperature Solid Oxide Fuel Cells Using the Ceria-Carbonate Composite Electrolytes, Int. J. Hydrogen Energy, vol. 37, (2012), pp. 19351-19356.

* cited by examiner

THREE-DIMENSIONAL ARCHITECTURED ANODE, A DIRECT CARBON FUEL CELL INCLUDING THE THREE-DIMENSIONAL ARCHITECTURED ANODE, AND RELATED METHODS

CROSS-REFERENCE TO RELATED APPLICATIONS

This application is a national phase entry under 35 U.S.C. § 371 of International Patent Application PCT/US2018/042628, filed Jul. 18, 2018, designating the United States of America and published as International Patent Publication WO 2019/018489 A1 on Jan. 24, 2019, which claims the benefit under Article 8 of the Patent Cooperation Treaty to U.S. Patent Application Ser. No. 62/534,452, filed Jul. 19, 2017.

STATEMENT REGARDING FEDERALLY SPONSORED RESEARCH OR DEVELOPMENT

This disclosure was made with government support under Contract Number DE-AC07-05ID14517 awarded by the United States Department of Energy. The government has certain rights in the disclosure.

TECHNICAL FIELD

This disclosure, in various embodiments, relates to an electrochemical cell for generating electricity. More specifically, embodiments of the disclosure relate to a fuel cell with an architectured anode framework.

BACKGROUND

Highly efficient and environmentally friendly use of solid carbons, the most abundant and cheapest energy source on the earth, is of great importance to meet increasing global energy demand and environmental sustainability. Direct carbon fuel cells (DCFCs) have gained much interest because of their high efficiency, use of solid carbon fuel, and being carbon dioxide capture ready. However, performance has been unsatisfactory largely because of insufficient contacts between carbon particles and conducting phases in the fuel electrode. Therefore, a need exists for an innovative approach to develop DCFCs with higher power density and carbon utilization.

Carbon, the main component of coal and biomass, is expected to continue dominating power generation in developing countries because of its low price and high volumetric energy density. Conventional power generation from carbon (coal) is a combustion process and has low energy conversion efficiency because of the limitation of the Carnot cycle. Fuel cells have received considerable attention as clean alternatives for carbon and hydrocarbon use, where chemical energy is converted into electric power electrochemically with high efficiency and low emissions. Direct carbon fuel cells have an ultrahigh efficiency of close to 100 percent.

Currently, almost all DCFCs must be operated at a temperature range of 600° C. 900° C. However, high operating temperature leads to reverse Boudouard reaction and decreases the energy conversion efficiency. More importantly, issues associated with the high temperature operation, such as high degradation rate, sealing failure, use of expensive materials, slow response to rapid start-up, and poor thermal cycling are hard to overcome. Direct electrochemical oxidation of solid carbon is possible at lower temperatures (<700° C.) in some DCFC systems. However, the primary challenge in achieving carbon direct oxidation at reduced temperature is effectively bringing solid carbon particles to the electrolyte/electrode interface and forming triple phase boundaries (TPBs) between the solid fuel, anode, and electrolyte, where electrochemical oxidation can take place. Therefore, the design of fuel composition and anode structure is of ultimate importance for achieving high performing DCFCs. Additionally, proper cathode materials with high oxygen reduction reaction activity are crucial for operating DCFCs at lower temperatures.

BRIEF SUMMARY

Embodiments described herein include a method of fabricating a three-dimensional (3D) architectured anode. The method comprises immersing a fabric textile in a precursor solution, the precursor solution comprising a nickel salt and gadolinium doped ceria (GDC). The nickel salt and GDC are absorbed to the fabric textile. The fabric textile comprising the absorbed nickel salt and GDC is removed from the precursor solution and calcined to form a 3D architectured anode comprising nickel oxide and GDC.

Embodiments described herein include a method of forming a direct carbon fuel cell. The method comprises forming a 3D architectured anode comprising nickel oxide and GDC on a first surface of an electrolyte. A fuel is applied to the 3D architectured anode and a strontium-doped samarium cobaltite-GDC cathode is formed on a second surface of the electrolyte.

In accordance with another embodiment described herein, a direct carbon fuel cell is described. The direct carbon fuel cell comprises a carbonate-GDC electrolyte, a 3D architectured anode on a first side of the carbonate-GDC electrolyte, a fuel in the 3D architectured anode, and a cathode comprising a strontium-doped samarium cobaltite-GDC material on a second side of the carbonate-GDC electrolyte.

DETAILED DESCRIPTION

Figure 1:
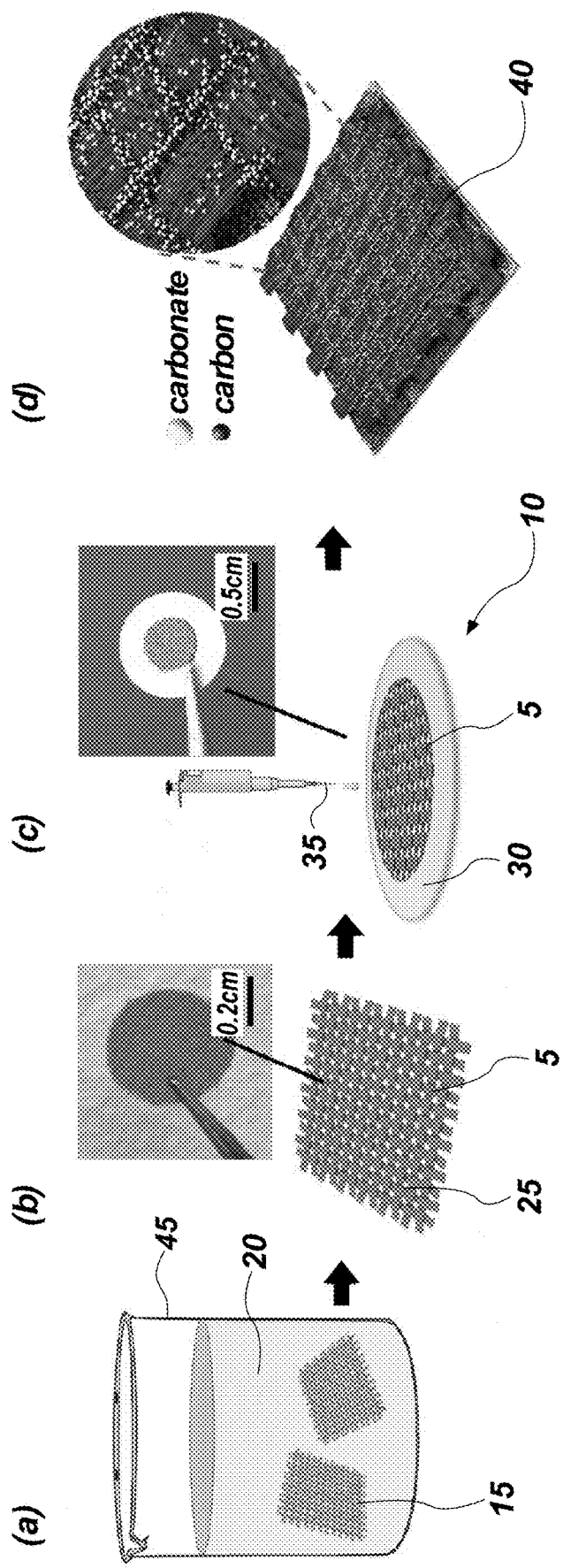
FIGS. 1a-1d are simplified schematics of a method for fabricating a 3D architectured anode according to embodiments of the disclosure.

The disclosure is directed to a 3D architectured anode and to a DCFC that includes the 3D architectured anode, a cathode, and a composite electrolyte, where the DCFC may be operated below a temperature of about 650° C., such as from about 400° C. to about 650° C. The 3D architectured anode of the DCFC is utilized in combination with the composite electrolyte to form a 3D architectured anode frame that provides additional pathways for a fuel to reach an active reaction zone of the DCFC. The fuel is placed within the 3D architectured anode frame. The composite electrolyte provides increased ionic conductivity to the DCFC. The DCFC, therefore, exhibits increased carbon oxidation activity and increased carbon utilization at the operation temperature of less than about 650° C. In some embodiments, the DCFC includes a carbonate-gadolinium doped ceria composite electrolyte bonded to the 3D architectured anode (i.e., the 3D architectured anode frame), a carbon fuel in the 3D architectured anode frame, and a cathode comprising strontium-doped samarium cobaltite-gadolinium doped ceria. Methods of forming the 3D architectured anode and methods of forming the DCFC are also disclosed.

This disclosure addresses the challenges of low carbon oxidation activity and low carbon utilization that are observed with conventional DCFCs and advances the performance of DCFCs at intermediate temperatures, such as temperatures from about 400° C. to about 650° C. The 3D architectured anode frame can potentially expedite the next-generation of high performing fuel cells. The 3D architectured anode frame may also be utilized in other energy systems, including Li-metal batteries and supercapacitors. Direct electrochemical oxidation of solid carbon in the DCFC including the 3D architectured anode frame was observed at 500° C. 600° C. with high carbon utilization. The high synergistic conduction of the composite electrolyte and the 3D architectured anode offered more paths for carbon catalytic oxidation, leading to a significant increase in cell performance at temperatures from about 400° C. to about 650° C.

The following description provides specific details to provide a thorough description of embodiments of the disclosure. However, a person of ordinary skill in the art will understand that the embodiments of the disclosure may be practiced without using these specific details. Indeed, the embodiments of the disclosure may be practiced in conjunction with conventional systems and methods used in the industry. In addition, only those components and acts necessary to understand the embodiments of the disclosure are described in detail. A person of ordinary skill in the art will understand that some components may not be described herein but that using various conventional components and acts would be in accord with the disclosure. Any drawings accompanying the present disclosure are for illustrative purposes only and are not necessarily drawn to scale. Elements common among figures may retain the same numerical designation.

As used herein, spatially relative terms, such as "beneath," "below," "lower," "bottom," "above," "upper," "top," "front," "rear," "left," "right," and the like, may be used for ease of description to describe one element's or feature's relationship to another element(s) or feature(s) as illustrated in the figures. Unless otherwise specified, the spatially relative terms are intended to encompass different orientations of the materials in addition to the orientation depicted in the figures. For example, if materials in the figures are inverted, elements described as "below" or "beneath" or "under" or "on bottom of" other elements or features would then be oriented "above" or "on top of" the other elements or features. Thus, the term "below" can encompass both an orientation of above and below, depending on the context in which the term is used, which will be evident to one of ordinary skill in the art. The materials may be otherwise oriented (e.g., rotated 90 degrees, inverted, flipped) and the spatially relative descriptors used herein interpreted accordingly.

As used herein, the singular forms "a," "an," and "the" are intended to include the plural forms as well, unless the context clearly indicates otherwise.

As used herein, "and/or" includes any and all combinations of one or more of the associated listed items.

As used herein, the term "configured" refers to a size, shape, material composition, and arrangement of one or more of at least one structure and at least one apparatus facilitating operation of one or more of the structure and the apparatus in a pre-determined way.

As used herein, the term "substantially" in reference to a given parameter, property, or condition means and includes to a degree that one of ordinary skill in the art would understand that the given parameter, property, or condition is met with a degree of variance, such as within acceptable manufacturing tolerances. By way of example, depending on the particular parameter, property, or condition that is substantially met, the parameter, property, or condition may be at least 90.0% met, at least 95.0% met, at least 99.0% met, or even at least 99.9% met.

As used herein, the term "about" or "approximately" in reference to a numerical value for a given parameter is inclusive of the numerical value and has the meaning dictated by the context (e.g., it includes the degree of error associated with measurement of the given parameter). For example, "about" or "approximately" in reference to a numerical value may include additional numerical values within a range of from 90.0 percent to 110.0 percent of the numerical value, such as within a range of from 95.0 percent to 105.0 percent of the numerical value, within a range of from 97.5 percent to 102.5 percent of the numerical value, within a range of from 99.0 percent to 101.0 percent of the numerical value, within a range of from 99.5 percent to 100.5 percent of the numerical value, or within a range of from 99.9 percent to 100.1 percent of the numerical value.

As used herein, the term "electrode" means and includes an electrode having a relatively lower electrode potential in an electrochemical cell (i.e., lower than the electrode potential in a positive electrode therein) or an electrode having a relatively higher electrode potential in an electrochemical cell (i.e., higher than the electrode potential in a negative electrode therein).

As used herein the term "electrolyte" means and includes an ionic conductor, which can be in a solid state, a liquid state, or a gas state (e.g., plasma).

The electrolyte of the DCFC may be a composite electrolyte that is highly conductive and includes carbonate-gadolinium doped ceria (GDC), such as $Gd:CeO_2$—$Li/Na_2CO_3$. The composite electrolyte may be configured as pellets or other desired configuration, such as by pressing the carbonate-gadolinium doped ceria material into pellets and sintering the pellets. The carbonate-gadolinium doped ceria electrolyte may be formed by conventional techniques and may be formed into conventional configurations. For instance, lithium-potassium carbonate ($Li_{0.67}K_{0.33}CO_3$) may be calcined, mixed with GDC powders, and additional calcination of the mixture conducted to form the carbonate-gadolinium doped ceria. Relative amounts of the carbonate and the gadolinium doped ceria may be selected depending on the desired composition of the composite electrolyte. In some embodiments, the composite electrolyte is GDC-Li/$Na_2CO_3$.

The 3D architectured anode of the DCFC includes a metal oxide-gadolinium doped ceria (MO-GDC) material. The 3D architectured anode includes a fibrous frame including bundles of fibers of the MO-GDC material, the metal oxide, and pores in walls of the MO-GDC fibers. The metal oxide may, for example, be in the form of particles. The fibrous frame provides sufficient mechanical strength and flexibility for the MO-GDC material to be processed and integrated into an article, such as the DCFC cell. Openings in the MO-GDC fibers of the 3D architectured anode are parallel to a longitudinal axis of the MO-GDC fibers and extend a length of the MO-GDC fibers. The fibers of the 3D architectured anode are, thus, hollow, with the hollow fibers providing reaction sites for the metal oxide. The pores in the MO-GDC fibers may be substantially evenly distributed along the fiber walls. The pores are nanosized and uniformly (e.g., evenly) distributed throughout the fiber walls and provide an increased surface area to the MO-GDC fibers. The openings and the pores enable fast mass transfer of molecules (e.g., ions) through the MO-GDC fibers. The 3D architectured anode is formed as described below.

The metal of the metal oxide may include, but is not limited to, a rare earth metal, an alkaline earth metal, a transition metal, a lanthanide, or combinations thereof. In some embodiments, the metal is nickel and the metal oxide is nickel oxide. The 3D architectured anode includes, for example, a nickel oxide-gadolinium doped ceria (NiO-GDC) material. Relative amounts of the nickel oxide and the gadolinium doped ceria may be selected depending on the desired composition of the 3D architectured anode. The 3D architectured anode includes the hollow fibers of the metal oxide-gadolinium doped ceria and exhibits mechanical strength and integrity. The hollow fibers may also be porous, such as exhibiting micron-sized pores, which enable the fuel to infiltrate the 3D architectured anode. Without being bound by any theory, it is believed that the pores enable the fuel, such as carbon particles, to absorb to the 3D architectured anode. Therefore, direct electrochemical oxidization is enabled at a temperature range of from about 400° C. to about 650° C. with a high carbon utilization. The hollow fibers of the 3D architectured anode may exhibit an average inner diameter of from about 0.5 μm to about 5.0 μm, such as from about 0.5 μm to about 2.5 μm, from about 0.5 μm to about 2.0 μm, or from about 1.0 μm to about 2.0 μm.

The fuel of the DCFC may be carbon. However, the DCFC may also be configured for use with other fuels, such as hydrogen or a hydrocarbon. In some embodiments, the fuel is carbon, such as graphitic carbon.

The cathode may be a highly catalytic-active cathode formed from strontium-doped samarium cobaltite (SSC)-gadolinium doped ceria (GDC). The SSC may be synthesized by conventional techniques, such as by a glycine-nitrate process. The SSC may include, for example, $Sm_{0.5}Sr_{0.5}CoO_3$. The SSC powder may be mixed with the GDC, such as from about 20 wt % GDC to about 50 wt % or from about 30 wt % GDC to about 40 wt % GDC, to produce the cathode. The SSC powder may account for from about 50 wt % GDC to about 80 wt % or from about 60 wt % GDC to about 70 wt % GDC. In one embodiment, about 40 wt % GDC was mixed with the SSC powder. The cathode may be formed by conventional techniques and may be formed into conventional configurations. In some embodiments, the cathode is SSC-GDC and includes 70 wt % SSC and 30 wt % GDC.

An embodiment of the disclosure is directed to a method for fabricating the 3D architectured anode and utilizing the 3D architectured anode in a DCFC. A 3D architectured anode 5 and a 3D architectured anode frame 10 may be formed by a soak and anneal process, as shown in FIG. 1a-1d. A fabric textile 15 is immersed in a precursor solution 20 containing at least one metal salt and the metal salt absorbed into the fabric textile 15, as shown in FIG. 1a. The metal salt of the precursor solution 20 is selected to form the oxide of the metal following calcination. The fabric textile 15 with the absorbed metal salt is removed from the precursor solution 20 and formed into a desired shape. The fabric textile 15 with the absorbed metal salt is annealed (e.g., calcined), forming the 3D architectured anode 5 including the metal oxide as shown in FIG. 1b. The 3D architectured anode 5 includes bundles of fibers 25. The 3D architectured anode 5 may then be bonded to a surface of a composite electrolyte 30 to form the 3D architectured anode frame 10, as shown in FIG. 1c. The 3D architectured anode 5 may be bonded to the composite electrolyte 30 by applying a binder 35 to the 3D architectured anode 5, as shown in FIG. 1c. The binder 35 reacts with the composite electrolyte 30 and the 3D architectured anode 5 to form the 3D architectured anode frame 10. A fuel 40 may then be incorporated into the 3D architectured anode frame 10. A cathode 55 (see FIG. 2) is formed adjacent to the 3D architectured anode frame 10, producing the DCFC 50 (see FIG. 2).

The 3D architectured anode 5 may be formed by immersing the fabric textile 15 in the precursor solution 20 of the metal oxide, which is prepared by dissolving a stoichiometric amount of the metal salt (e.g., a metal nitrate salt) in a solvent (e.g., distilled water). The metal salt may be commercially available. The fabric textile 15 is cut into a coupon having a desired shape and immersed in the precursor solution 20, as shown in FIG. 1a. The fabric textile 15 may be immersed for an amount of time sufficient to absorb the metal salt, such as from about 1 hour to about 24 hours or from about 5 hours to about 12 hours. The fabric textile 15 may be a low cost, carbon-based fabric, such as a cotton fabric. By way of example only, the fabric textile 15 may be commercially available from Telio (Montreal, Canada). The coupon may be sized such that the coupon is able to be completely submerged in a vessel 45 containing the precursor solution 20. The size of the coupon may also be sufficient to fit into a heater (e.g., a furnace) for annealing (e.g., sintering).

The fabric textile 15 including the absorbed metal salts may be moved to the heater (not shown) and heated to an appropriate temperature for an amount of time sufficient to ceramify (e.g., sinter, calcine) the metal salt and form the 3D architectured anode 5 including the metal oxide, as shown in FIG. 1b. The fabric textile 15 including the absorbed metal salts may be heated to a temperature between about 550° C. and about 850° C. for between about 1 hour and about 24 hours. The fabric textile 15 is, thus, converted to a ceramic textile that includes the 3D architectured anode 5. By using the fabric textile 15, the ceramic textile may be produced at a low cost. The 3D architectured anode 5 may be further modified by forming (e.g., coating) one or more of a catalyst or an electrocatalyst through techniques like wet infiltration or impregnation, PVD, or CVD on its surface. The 3D architectured anode 5 may be formed into a desired shape suitable for integration into a desired article, such as the DCFC 50. By way of example only, the 3D architectured anode 5 may be formed into a circular shape, such as by using a punch tool, e.g., a round punch type tool. The 3D architectured anode 5 may exhibit sufficient strength and flexibility to be formed into the desired shape without damaging the 3D architectured anode 5. The 3D architectured anode 5 may then be bonded to the composite electrolyte 30, as shown in FIG. 1c, by reacting the binder 35 with the composite electrolyte 30, forming the 3D architectured anode frame 10 of the DCFC 50. The binder 35 may include, but is not limited to, polyvinyl butyral (PVB) or a suspension of PVB and nickel oxide. The fuel 40 may be applied to the 3D architectured anode frame 10, as shown in FIG. 1d. The fuel 40 may, for example, be a carbon-carbonate fuel. The particle sizes of the carbon and carbonate and the carbonate/carbon ratio are exaggerated in FIG. 1d to clearly illustrate the mixture and location of the fuel 40. The fuel 40 may pass through the pores and into the 3D architectured anode frame 10.

In other embodiments of the disclosure, the fabric textile 15 is substantially completely submerged in the precursor solution 20, the fabric textile 15 is soaked for at least 12 hours, and the fabric textile 15 is a cotton fabric. In some embodiments, the fabric textile 15 is calcined by heating at 750° C. for at least 4 hours, and the calcined fabric textile (e.g., the 3D architectured anode 5) is cut into a shape, for example, by using a round punch type tool.

Figure 2:
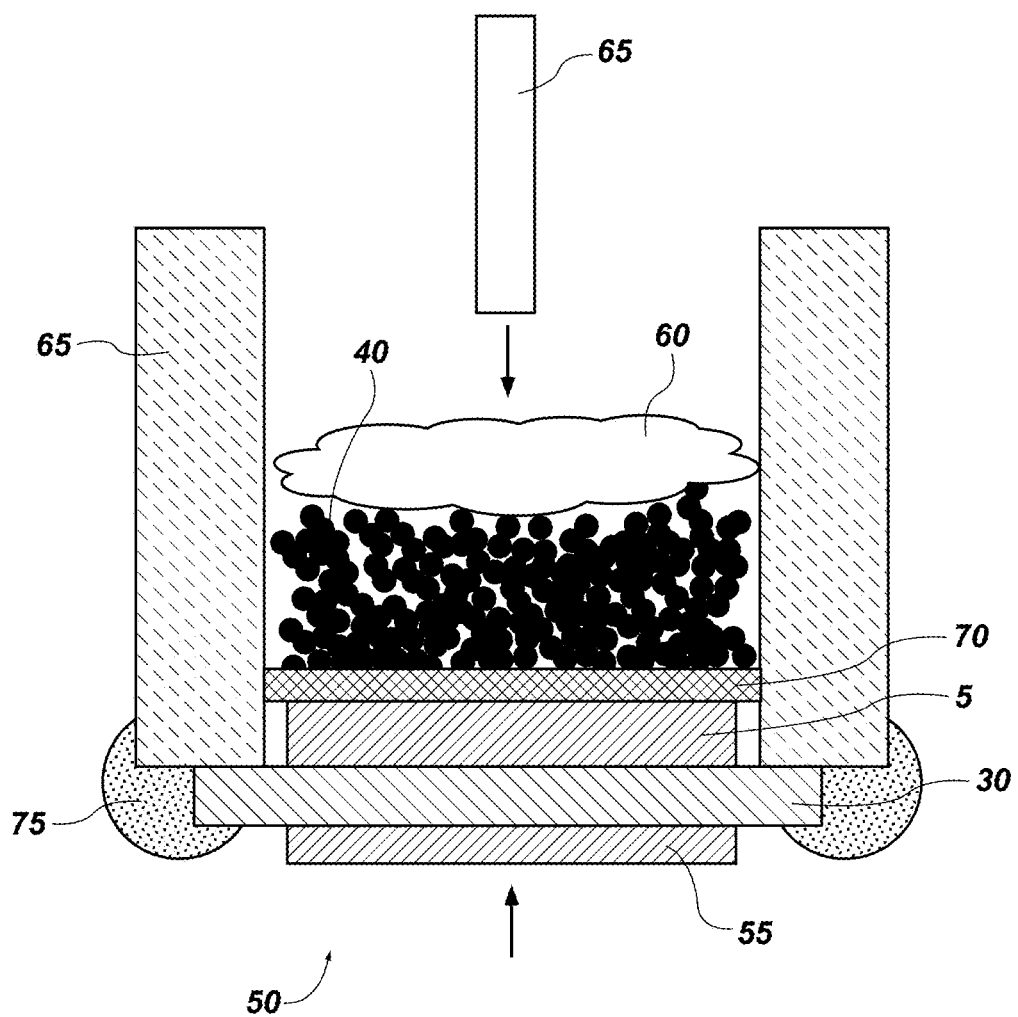
FIG. 2 is a schematic illustration of a DCFC including the 3D architectured anode according to embodiments of the disclosure and of a testing configuration for the DCFC.

Another embodiment of the disclosure is directed to the DCFC 50 that includes the 3D architectured anode 5, as shown in FIG. 2. FIG. 2 illustrates the DCFC 50 in an exemplary testing configuration, which includes ceramic tubes 65, sealant 75, silver mesh 70, etc., as discussed below. The DCFC 50 includes cathode 55, the composite electrolyte 30 adjacent to the cathode 55, the 3D architectured anode 5 adjacent to the composite electrolyte 30, and the fuel 40 adjacent to the 3D architectured anode 5. The composite electrolyte 30 is between the cathode 55 and the 3D architectured anode 5. The DCFC 50 is electrically connected (e.g., coupled) to a power source, and includes the 3D architectured anode 5, the cathode 55, and the composite electrolyte 30 between the 3D architectured anode 5 and the cathode 55.

In some embodiments, the DCFC 50 includes a carbonate-gadolinium doped ceria composite electrolyte 30 bonded to the 3D architectured anode 5, forming the 3D architectured anode frame 10. A carbon fuel 40 comprising carbon and carbonate particles is formed in the 3D architectured anode frame 10. However, other types of fuel, such as solid carbon, hydrocarbons (for example, methane, ethane, propane), and hydrogen, may also be used. The 3D architectured anode 5 is bonded to a first surface of the carbonate-gadolinium doped ceria composite electrolyte 30 and the cathode 55 comprising the strontium-doped samarium cobaltite-gadolinium doped ceria is formed adjacent to a second surface of the carbonate-gadolinium doped ceria composite electrolyte 30.

The following examples serve to explain embodiments of the disclosure in more detail. These examples are not to be construed as being exhaustive or exclusive as to the scope of the disclosure.

EXAMPLES

Example 1: Fabrication of the NiO-GDC 3D Architectured Anode

The 3D architectured anode was fabricated through a template-derived firing procedure. A NiO-GDC precursor solution was prepared by dissolving stoichiometric amounts of $Ni(NO_3)_2 \cdot 6H_2O$, $Gd(NO_3)_3 \cdot 6H_2O$ and $Ce(NO_3)_3 \cdot 6H_2O$ in distilled water. A fabric textile (commercially available from Telio (Montreal, Canada)) was immersed in the NiO-GDC precursor solution overnight, followed by heating (e.g., calcining, firing) at 750° C. for 4 hours with a heating rate of $1° C. \cdot min^{-1}$ to form a NiO-GDC ceramic textile as the 3D architectured anode. Coupons with a diameter of 3/16 inch (4.76 mm) were punched from the 3D architectured anode.

Example 2: Fabrication of the Carbonate-GDC Composite Electrolyte

Lithium-potassium carbonate, $Li_{0.67}K_{0.33}CO_3$, was formed by high-energy ball milling of $Li_2CO_3$ and $K_2CO_3$ in a mole ratio of 2:1 for 20 mins, followed by calcination at 600° C. for 2 h. Then, composite electrolyte powder was obtained by mixing GDC powders and the $Li/Na_2CO_3$ in a weight ratio of 3:7 and then calcining at 700° C. for 1 hour. After quenching, the composite powders were uniaxially pressed at 300 Mpa and fired at 750° C. for 4 h to form carbonate-GDC electrolyte pellets with a diameter of 10 mm.

Example 3: Fabrication of the Strontium-Doped Samarium Cobaltite-Gadolinium Doped Ceria Cathode The SSC powder was synthesized using a glycine-nitrate process as known in the art. The SSC was combined with GDC to form the SSC-GDC cathode including 70 wt % SSC and 30 wt % GDC.

Example 4: Cell Assembly and Testing

The NiO-GDC 3D architectured anode (described in Example 1) was bonded on a first side of the prepared carbonate-GDC composite electrolyte (described in Example 2) using a PVB/ethanol (10 wt %) solution with a loading of 30 $mL \cdot cm^{-2}$. The carbonate-GDC composite electrolyte bonded to the NiO-GDC 3D architectured anode was co-fired at 750° C. for 2 hours to form a half cell with the NiO-GDC 3D architectured anode, as schematically shown in FIG. 1c.

Graphite with carbonate was used as the carbon fuel, with the weight ratio of carbon to $Li_2CO_3$—$K_2CO_3$ being 2:8. A diluted slurry containing a 0.01 g mixture of carbon (e.g., graphite) and carbonate particles was placed onto the first side of the NiO-GDC 3D architectured anode frame, followed by drying at room temperature (between 20° C. and 25° C.) overnight to allow the carbon fuel to permeate into gaps in the 3D architectured anode frame and reach an interface between the NiO-GDC 3D architectured anode/carbonate-GDC composite electrolyte, as illustrated in FIG. 1d.

The cathode (70 wt % SSC and 30 wt % GDC, described in Example 3) was screen printed on the surface of the carbonate-GDC composite electrolyte pellet, followed by co-sintering at 750° C. for 2 hours. The active area was 0.178 $cm^{-2}$.

Button cells including the NiO-GDC 3D architectured anode, the carbonate-GDC composite electrolyte, and SSC-GDC cathode were sealed on an alumina tube with the anode side up. Silver mesh was used as current collectors with attached silver wires as leads. Ceramic cotton was inserted in the tube near the carbon fuel to prevent the solid carbon from flowing away while reducing and purging with gas. Hydrogen was used during ramping up. After NiO was fully reduced to metallic nickel, argon gas with a flow rate of 10 ml·min$^{-1}$ was swept in as purge gas. Oxygen and carbon dioxide (volume ratio of 30:70) with total flow rate 40 ml·min$^{-1}$ was fed as cathode gas. FIG. 2 illustrates the cell testing configuration used during testing, and included ceramic cotton 60, ceramic tubes 65, silver mesh 70, and sealant 75. In electrolyte conductivity measurement, the composite electrolyte pellet was prepared by uniaxial pressing the premixed powders under a pressure of 280 MPa. Silver paste was printed on both sides of the composite electrolyte pellet and fired at 700° C. for 1 hour as current collectors. The measurements were carried out in the frequency range from 0.1 Hz to 1 MHz with a bias voltage of 10 mV. Cell I-V and I-P measurements, as well as electrochemical impedance spectroscopy, were recorded using a Solartron 1400 Cell Test System when a stable open circuit voltage (OCV) was observed.

Example 5: Characterization of the NiO-GDC 3D Architectured Anode and the Carbonate-GDC Composite Electrolyte The phase purity of the NiO-GDC 3D architectured anode (described in Example 1) was examined with a Rigaku SmartLab X-Ray Diffraction (XRD) system in a 15° 90° angular range with 0.04 step size and a 1.6 s resonance time. The NiO-GDC 3D architectured anode microstructure as well as cell cross-section were characterized via either SEM equipped with a back scattering electron analysis or transmission electron microscopy equipped with energy dispersive spectrum analysis.

The total conductivity of the carbonate-GDC electrolyte was measured in air in a temperature range from 400° C.-650° C. using electrochemical impedances spectroscopy (EIS).

Figure 3:
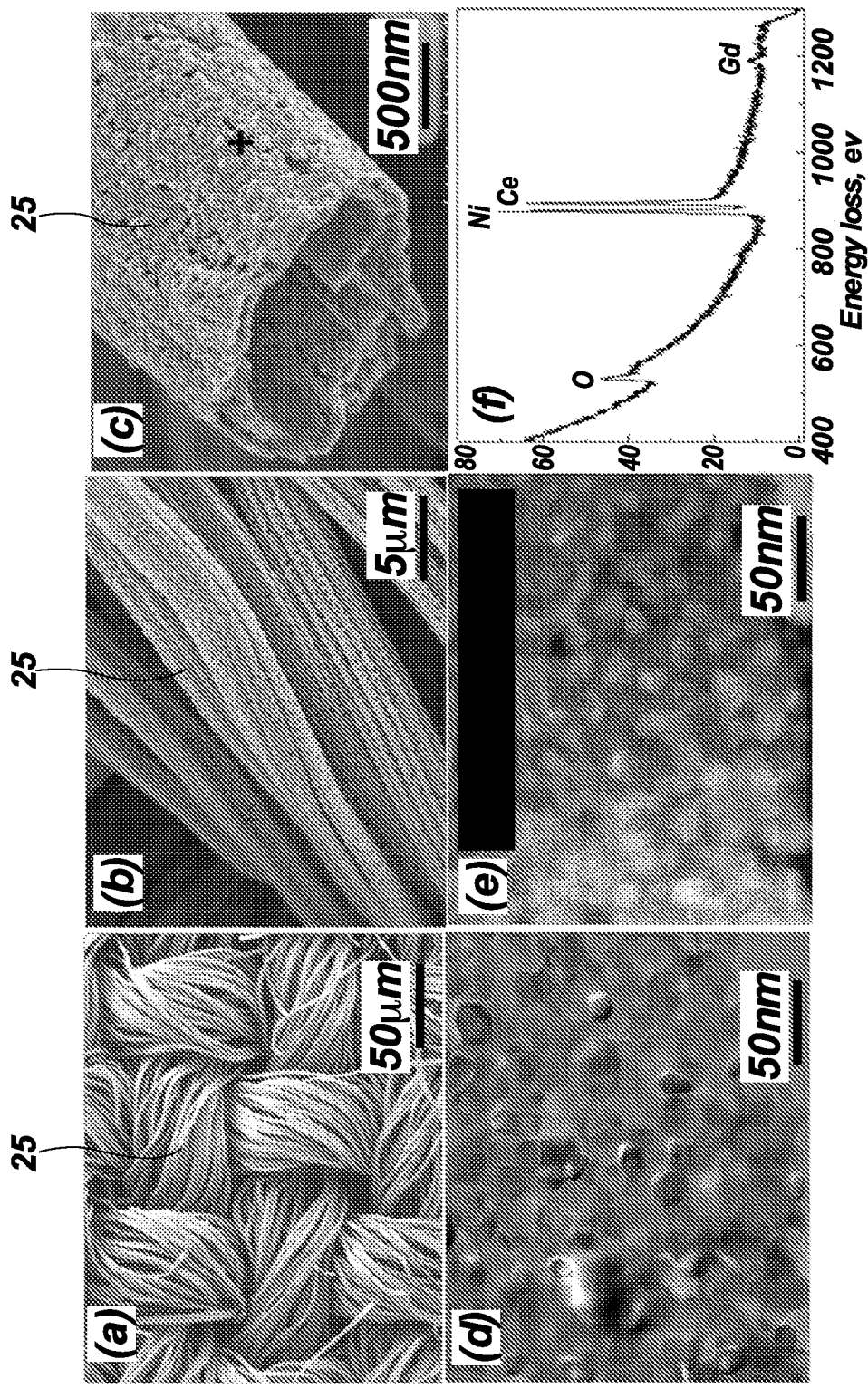
FIGS. 3a-3e are SEM images of a NiO-GDC 3D architectured anode according to embodiments of the disclosure and FIG. 3f is an electron energy-loss spectroscopy image.
Figure 4:
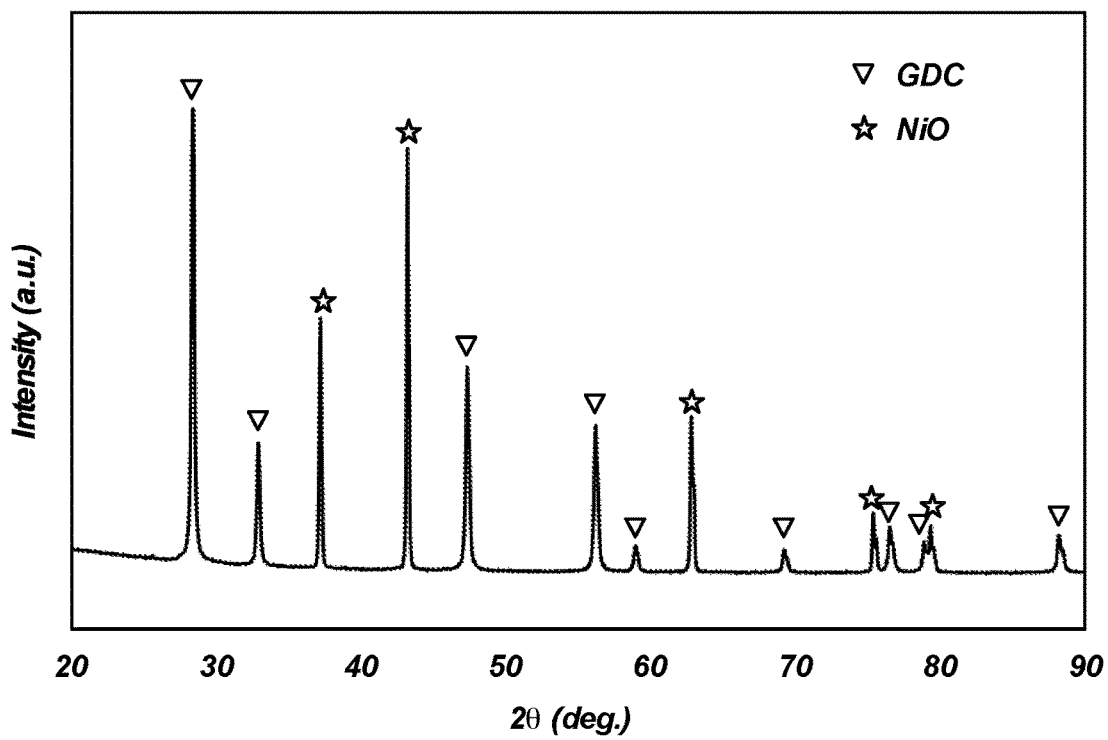
FIG. 4 is an x-ray diffraction (XRD) pattern of a NiO-GDC 3D architectured anode according to embodiments of the disclosure.

An SEM image of the 3D architectured anode (described in Example 1) is shown in FIG. 3a. The calcination formed bundles of the NiO-GDC fibers that were knit together forming a textile-like structure, ensuring not only 3D porosity but also a sufficient mechanical strength of the 3D architectured anode. An enlarged cross-sectional image of the NiO-GDC fibers is shown in FIGS. 3b and 3c. The NiO-GDC fibers were hollow with an average inner diameter of from 1 μm-2 μm, which allowed molten carbonate assisted carbon particles to thoroughly infiltrate into the structure of the 3D architectured anode. The hollow NiO-GDC fibers were formed by the outward diffusion of gases generated from the oxidization of the polymer additives as well as the decomposition of metal precursors during the calcination. Micron-sized pores were determined to be substantially evenly distributed throughout the wall of each NiO-GDC fiber, as shown in FIG. 3c, which further increased the specific surface area of the hollow NiO-GDC fibers and facilitated fast mass transfer. The detailed features of the hollow NiO-GDC fiber were further revealed by scanning transmission electron microscopy (STEM). The zero energy loss energy-filtered image (HAADF STEM), as shown in FIG. 3d, and the electron energy-loss spectroscopy (EELS) mapping, as shown in FIG. 3e, from the spot shown in FIG. 3c by a "+" symbol, showed a relatively uniform distribution of Ni (indicated by the light color) and Ce (indicated by the dark color) elements. FIG. 3f is an EELS spectrum focused on the same position, in which the peaks corresponding to O, Ni, Ce and Gd were clearly identified, indicating that the hollow NiO-GDC fibers included uniformly distributed NiO and GDC particles. The phase purity of the 3D architectured anode was examined with XRD. The standard phases of the NiO and GDC were confirmed (as shown in FIG. 4), indicating that the NiO-GDC fibers were well synthesized with no secondary phase.

The ionic conductivity of a dense GDC-carbonate composite electrolyte pellet was measured by EIS in a symmetric Ag/pellet/Ag configuration. The total resistance, including the bulk and grain boundary contributions, was calculated using low frequency intercept corresponding to the capacitive behavior of the Ag electrodes. The ionic conductivity was calculated using $\delta=L/(Z\times S)$, where Z is the impedance for the real axis in the Nyquist plot, L is the ceramic disk length, and S is the surface area, respectively. The ionic conductivity of the GDC-carbonate composite electrolyte was compared to that of a GDC electrolyte and an yttria stabilized zirconia (YSZ) electrolyte. The GDC-carbonate composite electrolyte was sintered at 750° C. for 4 h, while the GDC and YSZ electrolytes were sintered at 1400° C.

Figure 5:
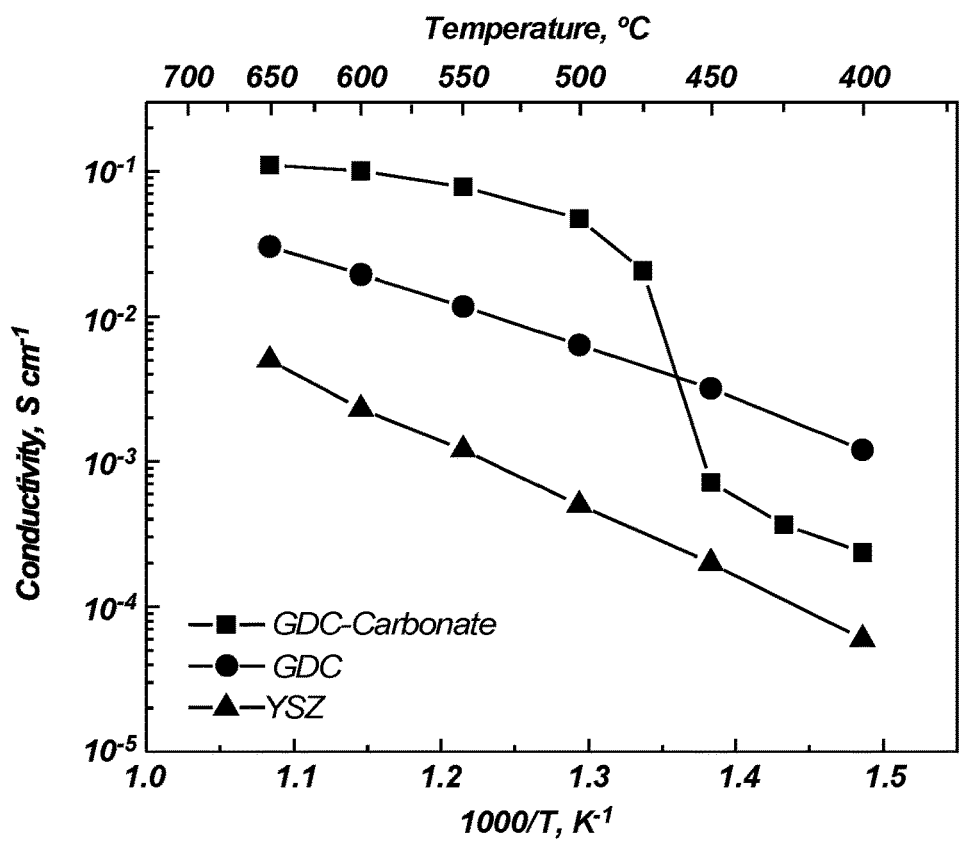
FIG. 5 is a graph comparing ionic conductivities of GDC-carbonate, GDC, and yttria stabilized zirconia (YSZ) in air.

The distribution of both GDC and carbonate phases was determined to be uniform and continuous. In addition, no cracks were observed both at the cathode/electrolyte and anode/electrolyte interfaces. When the temperature was above 500° C., the total conductivity of the composite electrolyte was 0.047 S·cm$^{-1}$, indicating a factor of 15 and 235 times higher than GDC and YSZ, respectively. Previous results suggested that the conductivity of the GDC-carbonate electrolyte highly depended on the volume fraction, especially at lower temperatures. The ionic conductivities of the GDC-carbonate composite electrolyte, a GDC electrolyte, and an YSZ electrolyte were plotted against the inverse of temperature as shown in FIG. 5.

Example 6: Electrochemical Performance

Figure 6B:
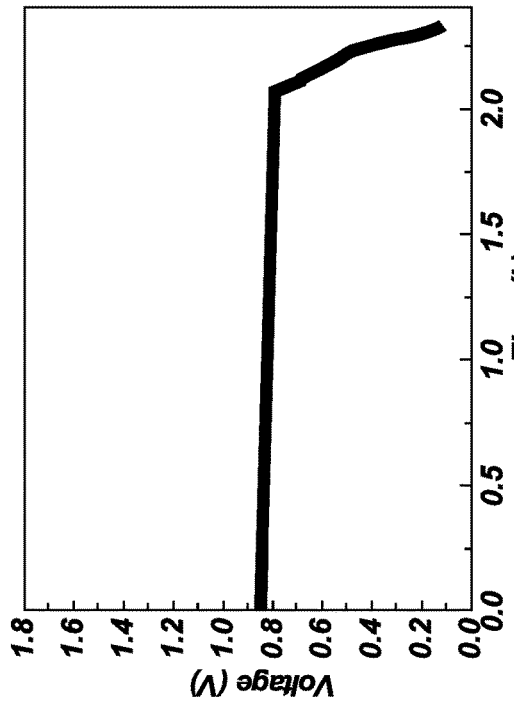
FIG. 6a-6d are graphs of various parameters of DCFCs including the 3D architectured anode according to embodiments of the disclosure.
Figure 6D:
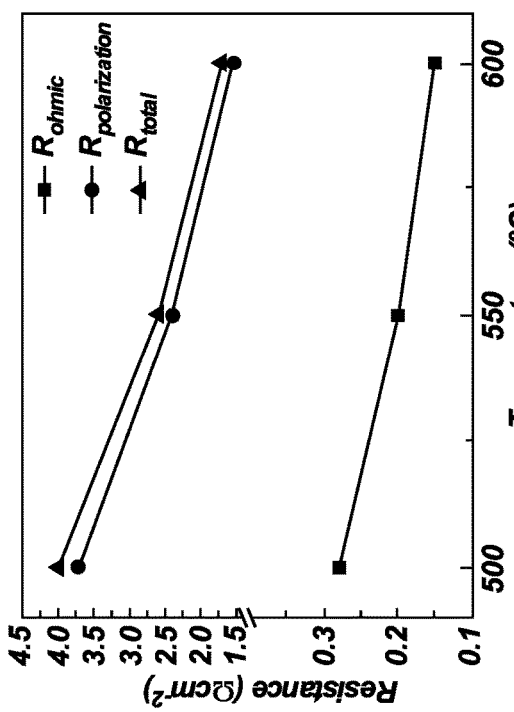
Figure 6A:
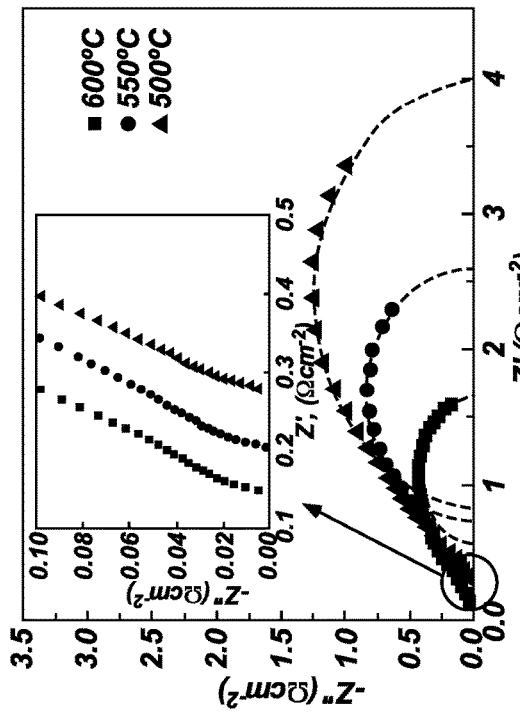

FIG. 6a shows current-voltage (I-V) polarization curves (e.g., polarization and power density curves) of the DCFCs (described in Example 4) with the 3D architectured anode (described in Example 1) and operated between 500° C. and 600° C. During the testing, argon was used as the purge gas and 75% $CO_2$-25% $O_2$ was used as the oxidant. The OCVs remained at approximately 1.19 V, 1.18 V and 1.16 V for operations at 500° C., 550° C., and 600° C., respectively. Theoretically, the OCV of a DCFC with oxygen as the oxidant is independent of temperature because carbon is always in its elementary state, and an equilibrium cell potential of 1.02 V should be expected in accordance with complete carbon oxidation reaction:

$$C+O_2 \rightarrow CO_2 \qquad (1)$$

However, it was determined that temperature dependence of cell potentials, and the OCVs are much higher than the equilibrium potential of 1.02V. Furthermore, the molten state of carbonates in the composite electrolyte and the 3D architectured anode will help eliminate potential issue of gas leakage through the composite electrolyte, resulting in high cell open circuit voltage. The maximum power densities reached 325 mW·cm$^{-2}$ and 196 mW·cm$^{-2}$ at 600° C. and 550° C., respectively. When the temperature was further reduced to 500° C., which is close to the melting point of $Li_2CO_3$—$K_2CO_3$ carbonate, a maximum power density of 143 mW·cm$^{-2}$ could still be achieved. Thus, the DCFCs having the NiO-GDC 3D architectured anode, Gd:CeO$_2$—Li/Na$_2$CO$_3$ composite electrolyte, and Sm$_{0.5}$Sr$_{0.5}$CoO$_3$ (SSC) cathode demonstrated excellent performance at intermediate temperatures with maximum power densities of 143, 196, and 325 mW·cm$^{-2}$ at 500° C., 550° C., and 600° C., respectively. At 500° C., the cells could be operated steadily at a constant polarization current density of 0.15 Acm$^{-2}$ for approximately 2 hours with a carbon utilization reaching 86%.

FIG. 6b displays the impedance spectra of a DCFC under OCV condition at different temperatures. The ohmic resistances of the DCFC, $R_s$, corresponding to the high frequency intercepts of the impedance spectra with the real axis in the Nyquist plots, were 0.28 Ω·cm$^2$, 0.20 Ω·cm$^2$, and 0.15 Ω·cm$^2$ at 500° C., 550° C. and 600° C., respectively. The intercepts in the low-frequency region are total resistances, including $R_s$ and the polarization resistance $R_p$. Thus, the $R_p$ can be obtained by subtracting $R_s$ from the total resistance. The calculated $R_p$ for the cell before stability testing was 3.27 Ω·cm$^2$, 2.40 Ω·cm$^2$, and 1.55 Ω·cm$^2$ at 500° C., 550° C., and 600° C., respectively.

Figure 6C:
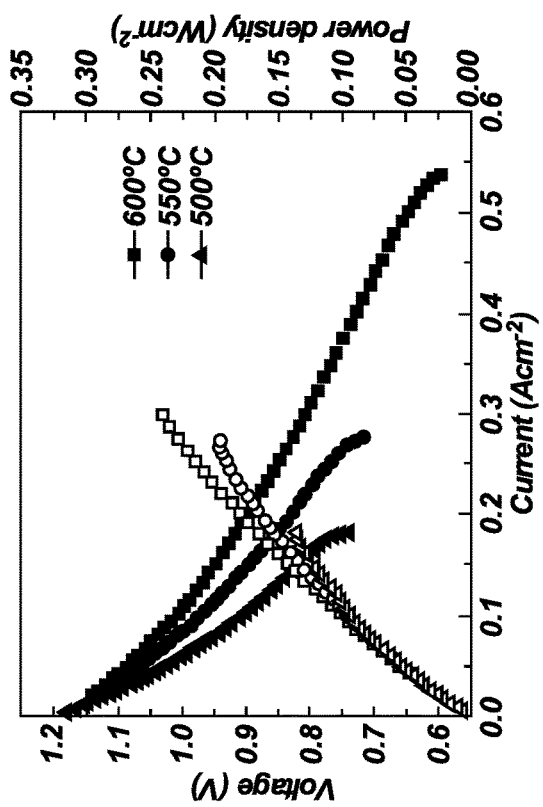

Though the ohmic and polarization resistances both demonstrated a decrease with the increase of temperature, as shown in FIG. 6c, their contributions to total resistance change were different. The ratio of ohmic resistance to total resistance decreased with the drop of temperature, while that of polarization resistance increased as shown below in Table 1.

TABLE 1

Variation of Ohmic and Polarization Resistances Versus Temperature

| Temperature (° C.) | $R_s$/ Ω·cm$^2$ | $R_p$/ Ω·cm$^2$ | $R_{total}$/ Ω·cm$^2$ | $R_s/R_{total}$ (%) | $R_p/R_{total}$ (%) |
|---|---|---|---|---|---|
| 500 | 0.28 | 3.72 | 4.0 | 7.0 | 93.0 |
| 550 | 0.2 | 2.4 | 2.6 | 7.7 | 92.3 |
| 600 | 0.15 | 1.55 | 1.7 | 8.8 | 91.2 |

Thus, reducing polarization resistance was important in further improving cell performance at lower temperatures. The DCFC could be operated at a constant current density of 0.15 A·cm$^{-2}$ for approximately 123 min followed with a sharp voltage drop, as shown in FIG. 6c, because of the limited fuel amount. Approximately 222 Coulombs of charge were released during the whole test, which is equivalent to the amount of electricity generated by 0.0069 g carbon through electrochemical reaction. Considering there was 0.008 g carbon (80 wt % of 0.01 g carbon-carbonate composite fuel) initially loaded in the 3D anode prior to the test, approximately 86% of the total carbon fuel was converted to electricity. FIG. 6d shows long term stability of the cell operated at 500° C. at a constant current density of 0.15 Acm$^{-2}$. The carbon utilization reached 86.2%.

Figure 7:
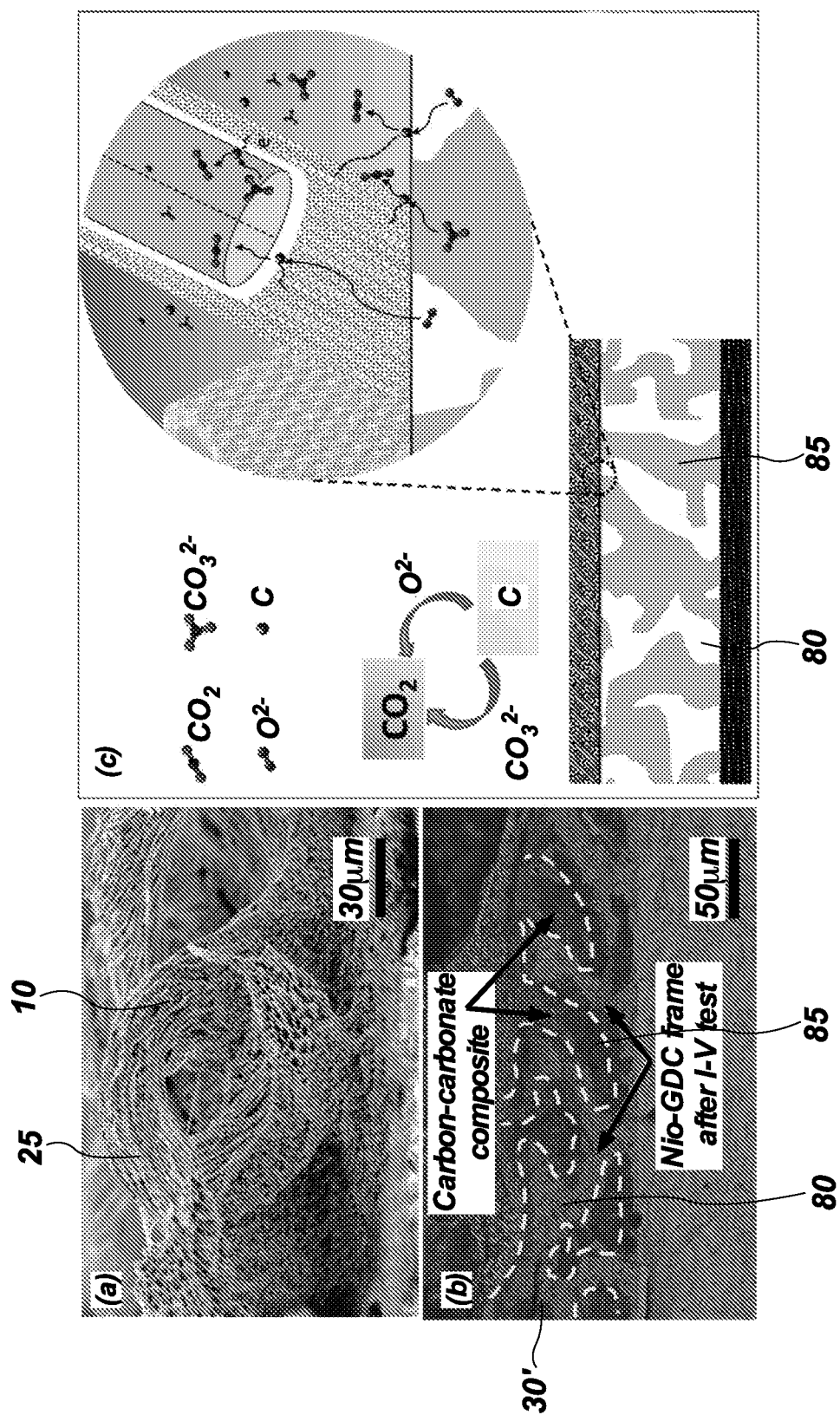
FIGS. 7a and 7b are SEM images and FIG. 7c is a schematic illustration of the 3D architectured anode according to embodiments of the disclosure at various testing stages.

FIGS. 7a and 7b are SEM images of the 3D architectured anode frame (FIG. 7a) before loading the carbon fuel and after conducting the electrochemical testing (FIG. 7b). The bundle of hollow NiO-GDC fibers were bonded very well with the GDC-carbonate electrolyte, establishing excellent contacts between the electrode and electrolyte, a critical step for enhancing charge transfer. After the carbon fuel was loaded, the carbon particles passed through the gaps between the NiO-GDC fibers and reached the electrolyte/electrode interface. The addition of the carbonate in the carbon fuel helped extend the electrolyte zone. Without being bound by any theory, it is believe that during use and operation, the added molten carbonates carried the carbon particles further into the hollow NiO-GDC fibers through the pores on the fiber wall, as shown in FIG. 7b. The composite electrolyte 30' is shown after the testing and includes an oxygen ion (O$^{2-}$) conducting phase 80 (e.g., the GDC) and a carbonate (CO$_3^{2-}$) conducting phase 85. The issue of carbon distribution within the 3D architectured anode 5 was well addressed by utilizing the 3D architectured hollow fiber anode frame. FIG. 7c illustrates the electrochemical processes near the electrolyte-anode interface. The cathode 55, the composite electrolyte 30, and the 3D architectured anode 5 are illustrated schematically in FIG. 7c, with an enlarged view of the interface between the composite electrolyte 30 and the 3D architectured anode 5. During use and operation, the composite electrolyte 30 includes an oxygen ion (O$^{2-}$) conducting phase (e.g., the GDC) and a carbonate (CO$_3^{2-}$) conducting phase (e.g., molten carbonate). In the DCFC configuration, both CO$_3^{2-}$ and O$^{2-}$ ions are transporting species in the composite electrolyte. Oxygen ions were conducted along the GDC bulk phase and grain boundary whereas carbonate ions transferred through the molten carbonate phase. Since the operating temperature was no higher than 600° C., the influence of reverse Boudouard reaction may be neglected due to the fact that the reverse Boudouard reaction is not thermodynamically spontaneous at 700° C. or lower. Therefore, the reaction mechanism at the 3D architectured anode is simplified. At the interface between the composite electrolyte and the 3D architectured anode, the carbon particles directly contacted the GDC phase and reacted with O$^{2-}$ to produce carbon dioxide and release electrons, whereas those contacting with the carbonate phase reacted with CO$_3^{2-}$ ions to produce carbon dioxide and electrons, simultaneously. The solid carbon particles are transported to the electrolyte/electrode interface and form TPBs between solid fuel, 3D architectured anode, and composite electrolyte, where electrochemical oxidation takes place. As shown in FIG. 3, the NiO-GDC fibers 25 of the 3D architectured anode 5, which include the hollow fibers of GDC and Ni phases, provide abundant sites for carbon particles to react with O$^{2-}$ ions. The addition of carbonate to the carbon fuel was believed to provide reaction pathways for carbon to react with CO$_3^{2-}$. In the cathode, the oxygen was believed to be directly reduced into oxygen ions and also react with CO$_2$ to generate carbonate ions. The anode and cathode reactions are expressed as:

Cathode Side Reaction:

$$O_2 + 4e^- \rightarrow 2O^{2-} \quad (2)$$

$$O_2 + 2CO_2 + 4e^- \rightarrow 2CO_3^{2-} \quad (3)$$

Anode Side Reaction:

$$C + 2O^{2-} \rightarrow CO_2 + 4e^- \quad (4)$$

$$C + 2CO_3^{2-} \rightarrow 3CO_2 + 4e^- \quad (5)$$

Thus, the direct electrochemical oxidation of solid carbon in the DCFC at 500° C.-600° C. with high carbon utilization was observed. It is believed that further modification of the cathode may further increase cell performance.

For comparison, in conventional carbonate based DCFCs, the carbonates were restricted in the electrolyte layer only, the power output was highly limited by the mass transfer within the anode, especially near the molten point of carbonates. The lack of TPBs between carbon and ion conducting phases resulted in a very low carbon utilization.

The invention claimed is:
1. A method of fabricating a three-dimensional architectured anode comprising:
immersing a fabric textile in a precursor solution comprising a nickel salt and gadolinium doped ceria (GDC) to absorb the nickel salt and GDC to the fabric textile;
removing the fabric textile comprising the absorbed nickel salt and GDC from the precursor solution; and calcining the fabric textile to form the three-dimensional architectured anode comprising nickel oxide and GDC.

2. The method of claim 1, wherein immersing a fabric textile in a precursor solution comprises immersing a carbon-based textile in the precursor solution.

3. The method of claim 1, wherein immersing a fabric textile in a precursor solution comprises immersing a cotton fabric in the precursor solution.

4. The method of claim 1, wherein immersing a fabric textile in a precursor solution comprises immersing the fabric textile in a nickel nitrate-gadolinium doped ceria precursor solution.

5. The method of claim 1, wherein calcining the fabric textile comprises heating the fabric textile comprising the absorbed nickel salt and GDC at 750° C. for at least 4 hours.

6. The method of claim 1, wherein calcining the fabric textile comprises forming hollow fibers of nickel oxide-gadolinium doped ceria.

7. The method of claim 1, wherein calcining the fabric textile comprises forming porous, hollow fibers of nickel oxide-gadolinium doped ceria.

8. The method of claim 1, further comprising forming the three-dimensional architectured anode into a shape.

9. A method of forming a direct carbon fuel cell, comprising:
forming a three-dimensional architectured anode comprising nickel oxide and gadolinium doped ceria (GDC) on a first surface of an electrolyte;
applying a fuel to the three-dimensional architectured anode; and
forming a strontium-doped samarium cobaltite-GDC cathode on a second surface of the electrolyte.

10. The method of claim 9, wherein forming a three-dimensional architectured anode comprising nickel oxide and GDC on a first surface of an electrolyte comprises forming the three-dimensional architecture anode on the first surface of a carbonate-GDC electrolyte.

11. The method of claim 9, wherein forming a three-dimensional architectured anode comprising nickel oxide and GDC on a first surface of an electrolyte comprises forming the three-dimensional architecture anode on the first surface of a $Gd:CeO_2$—$Li/Na_2CO_3$ electrolyte.

12. The method of claim 9, wherein forming a three-dimensional architectured anode comprising nickel oxide and GDC on a first surface of an electrolyte comprises bonding the electrolyte and the three-dimensional architectured anode.

13. The method of claim 12, wherein bonding the electrolyte and the three-dimensional architectured anode comprises applying a binder to the electrolyte and the three-dimensional architectured anode.

14. The method of claim 9, wherein applying a fuel to the three-dimensional architectured anode comprises applying a carbon fuel to the three-dimensional architectured anode.

15. The method of claim 9, wherein applying a fuel to the three-dimensional architectured anode comprises applying a hydrogen fuel or a hydrocarbon fuel to the three-dimensional architectured anode.

16. A direct carbon fuel cell comprising:
a carbonate-gadolinium doped ceria electrolyte;
a three-dimensional architectured anode on a first side of the carbonate-gadolinium doped ceria electrolyte;
a fuel in the three-dimensional architectured anode; and
a cathode comprising a strontium-doped samarium cobaltite-gadolinium doped ceria material on a second side of the carbonate-gadolinium doped ceria electrolyte.

17. The direct carbon fuel cell of claim 16, wherein the three-dimensional architectured anode is a nickel oxide-gadolinium doped ceria three-dimensional architectured anode.

18. The direct carbon fuel cell of claim 16, wherein the fuel comprises carbon, hydrogen, or a hydrocarbon.

19. The direct carbon fuel cell of claim 16, wherein the carbonate-gadolinium doped ceria electrolyte is configured as a pellet.

* * * * *